(12) United States Patent
Lim et al.

(10) Patent No.: US 8,306,472 B2
(45) Date of Patent: Nov. 6, 2012

(54) REPEATER AND METHOD FOR PROCESSING SIGNAL, AND METHOD FOR CONVERTING SYNCHRONOUS FREQUENCY THEREOF

(75) Inventors: Hyoung Soo Lim, Daejeon (KR); Ho Min Eum, Daejeon (KR); Sung Ik Park, Daejeon (KR); Jae Hyun Seo, Daejeon (KR); Yong Tae Lee, Daejeon (KR); Yong Hoon Lee, Daejeon (KR); Sung-Hoon Kim, Daejeon (KR); Heung Mook Kim, Daejeon (KR); Jong Soo Lim, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 361 days.

(21) Appl. No.: 12/741,081

(22) PCT Filed: Sep. 26, 2008

(86) PCT No.: PCT/KR2008/005720
§ 371 (c)(1),
(2), (4) Date: May 3, 2010

(87) PCT Pub. No.: WO2009/066866
PCT Pub. Date: May 28, 2009

(65) Prior Publication Data
US 2010/0265996 A1    Oct. 21, 2010

(30) Foreign Application Priority Data
Nov. 21, 2007 (KR) .................. 10-2007-0119096

(51) Int. Cl.
*H04Q 7/32* (2006.01)

(52) U.S. Cl. ............... 455/20; 455/7; 455/11.1; 455/22; 455/21; 455/67.11; 370/310; 370/315; 370/317; 370/324; 370/350; 375/211; 375/213

(58) Field of Classification Search .................. 455/20, 455/7, 11.1, 12.1, 21, 22, 23, 422.1, 403, 455/445, 550.1, 67.11, 500, 517, 67.13, 426.1, 455/426.2, 502; 370/315, 310, 317, 324, 370/350, 503; 375/211, 213
See application file for complete search history.

(56) References Cited

U.S. PATENT DOCUMENTS 6,973,121 B1 * 12/2005 Eberlein et al. ............... 375/211
(Continued)

FOREIGN PATENT DOCUMENTS

CN          1630279 A       6/2005
(Continued)

*Primary Examiner* — Keith Ferguson
(74) *Attorney, Agent, or Firm* — Rabin & Berdo, P.C.

(57) ABSTRACT

A repeater having different input and output frequencies converts a signal received with the input frequency to a first intermediate frequency signal based on a local oscillating frequency for intermediate frequency conversion, and converts the first intermediate frequency signal to a second intermediate frequency signal by performing digital processing on the first intermediate frequency signal. Then, the repeater generates a first frequency tone signal that corresponds to a difference between the input and output frequencies, and generates a second frequency tone signal from the local oscillating frequency for intermediate frequency conversion and the first frequency tone signal. The repeater up-converts the second intermediate frequency signal to the output frequency based on the second frequency tone signal, and transmits the signal.

13 Claims, 4 Drawing Sheets

U.S. PATENT DOCUMENTS

| | | |
|---|---|---|
| 7,272,365 B2 | 9/2007 | Cleary et al. |
| 7,773,665 B2 | 8/2010 | Eum et al. |
| 2006/0063487 A1* | 3/2006 | Cleveland et al. .............. 455/22 |
| 2009/0129450 A1 | 5/2009 | Eum et al. |

FOREIGN PATENT DOCUMENTS

| | | |
|---|---|---|
| CN | 1965580 A | 5/2007 |
| KR | 2000-0032374 A | 6/2000 |
| KR | 2005-0017192 A | 2/2005 |
| KR | 2006-0027077 A | 3/2006 |
| KR | 2006-0047837 A | 5/2006 |
| KR | 2006-0101194 A | 9/2006 |
| KR | 100805815 B1 | 2/2008 |
| WO | WO-2008/069592 A1 | 6/2008 |

* cited by examiner

[Fig. 1]
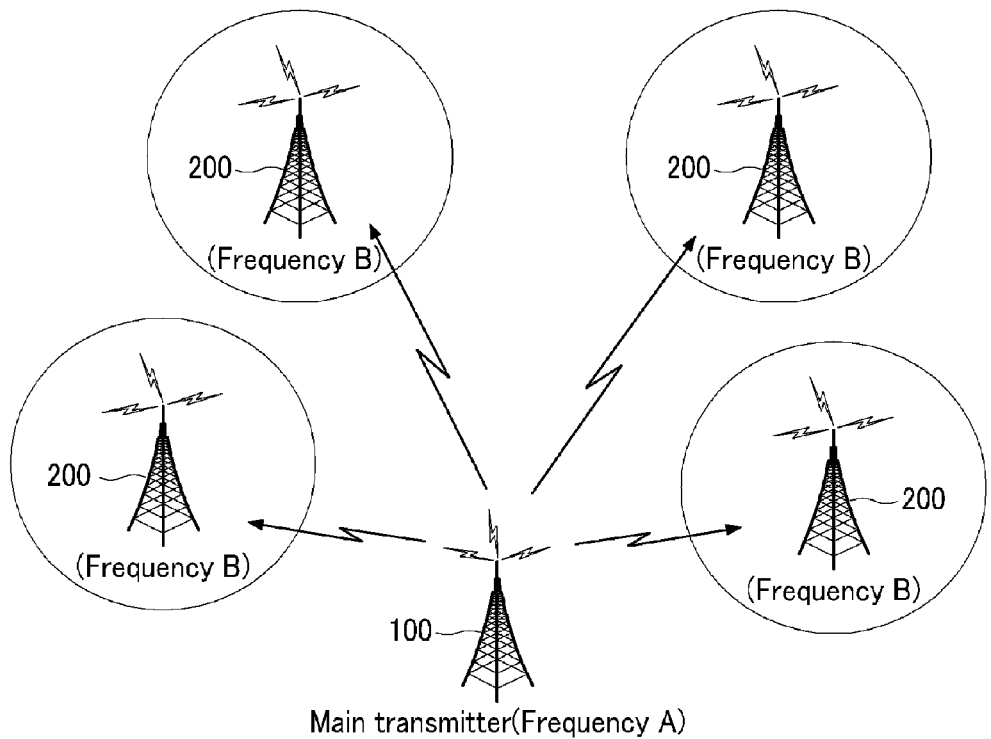
[Fig. 2]
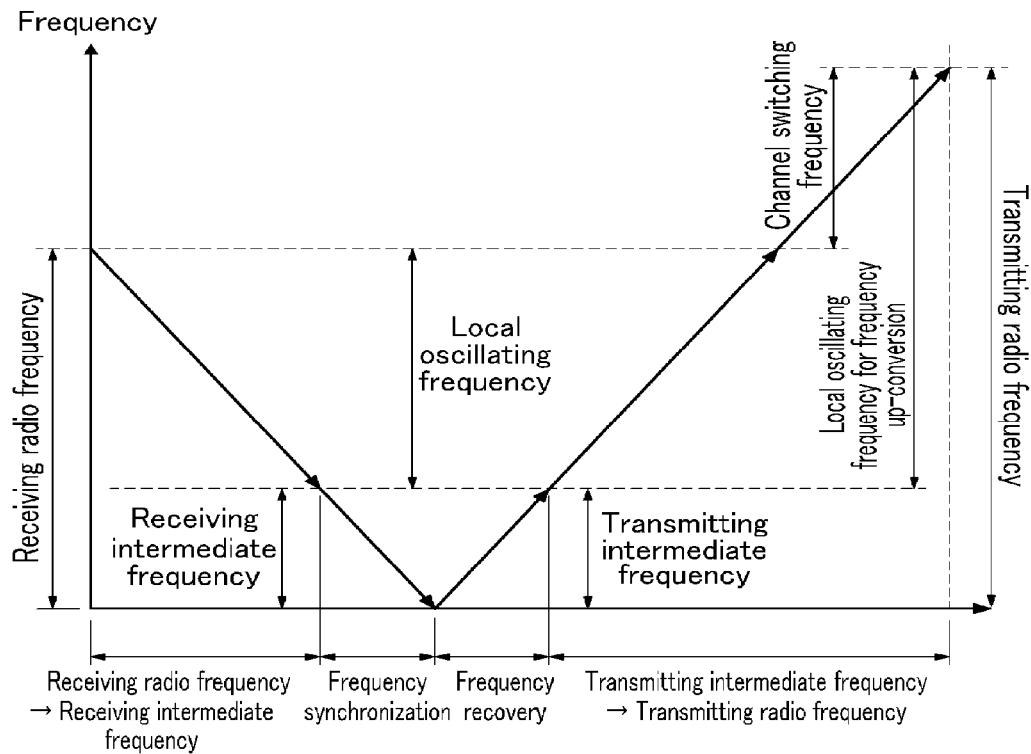

[Fig. 3]
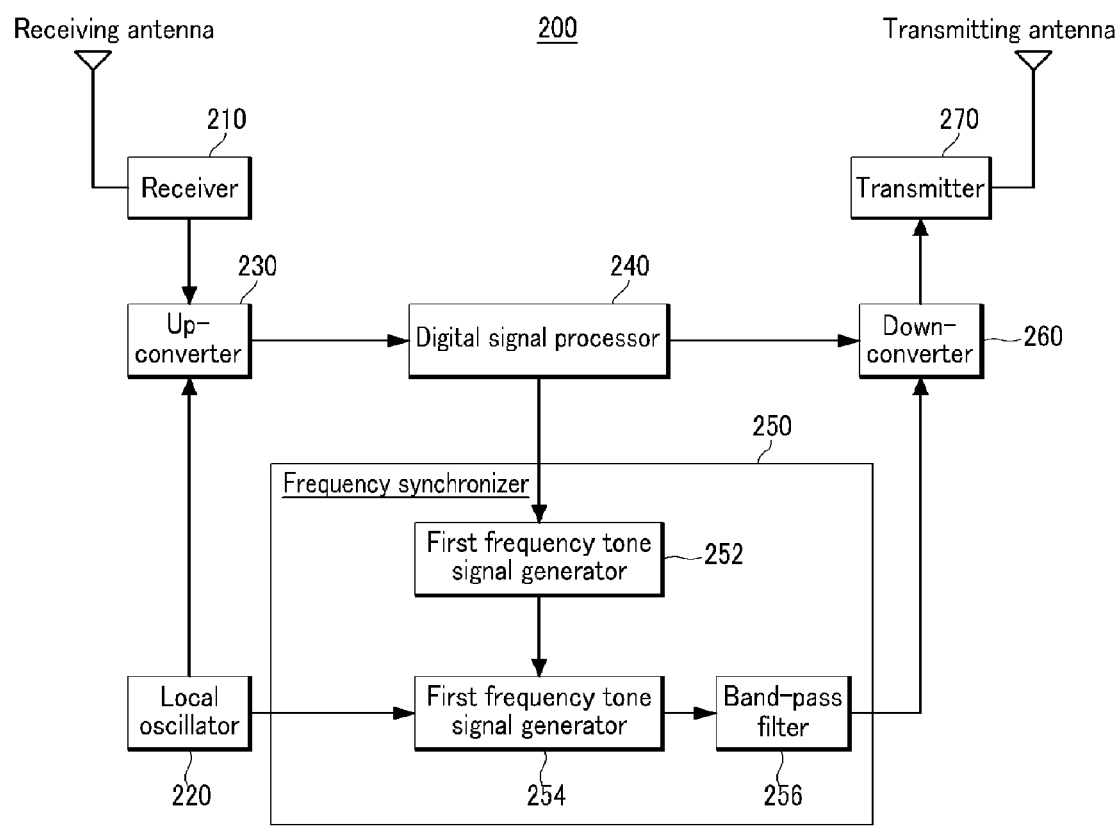

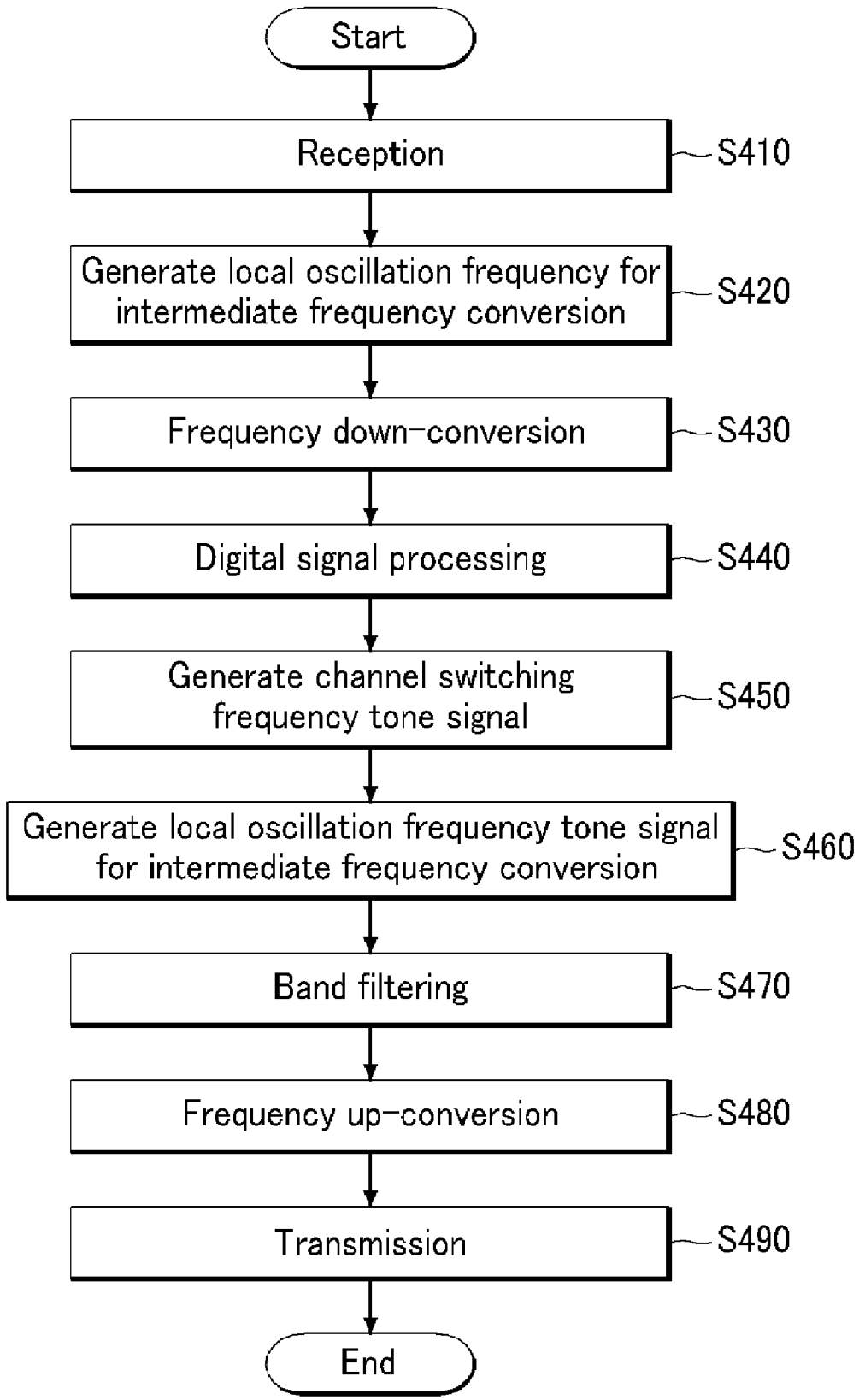
[Fig. 4]

[Fig. 5]
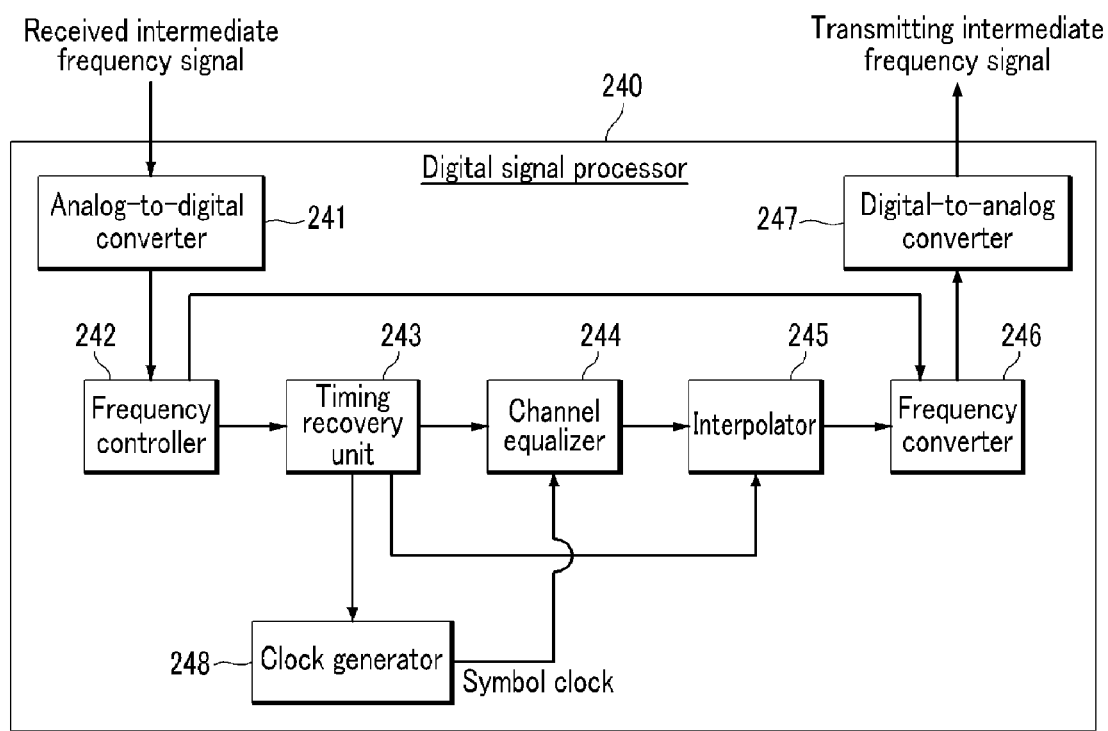

US 8,306,472 B2

REPEATER AND METHOD FOR PROCESSING SIGNAL, AND METHOD FOR CONVERTING SYNCHRONOUS FREQUENCY THEREOF

TECHNICAL FIELD

The present invention relates to a repeater, and a signal processing method and a frequency synchronization conversion method of the repeater. More particularly, it relates to a frequency synchronization method for reducing output frequency errors between a plurality of repeaters using an identical output frequency that is different from that of a transmitting signal of a main transmitter.

The present invention is supported by the IT R&D program of MIC/IITA [2006-S-016-02, Development of Distributed Translator Technology for Terrestrial DTV].

BACKGROUND ART

In general, repeaters are installed in areas in which signals transmitted from a main transmitter are weak in order to solve unstable reception and expand the transmission range of the signals.

When receiving a signal from the main transmitter, the repeater frequency down-converts the received signal to an intermediate frequency signal and up-converts to the intermediate frequency signal again, and then up-converts the intermediate frequency signal to a frequency corresponding to an output frequency. In this instance, the repeater can use a frequency that is different from an input frequency for receiving the signal from the main transmitter as an output frequency.

When the input frequency and output frequency of the repeater are different from each other, the repeater should generate a tone signal to be mixed with an intermediate frequency signal in order to generate an output frequency that equals the input frequency of the repeater. When the tone signal is generated by using an output signal of a local oscillator that has a frequency error, the tone signal frequency becomes inaccurate, thereby deteriorating accuracy of the output frequency.

In order to solve such a problem, the repeater generates the tone signal from a symbol or a sample clock obtained by performing symbol timing synchronization on the signal of the main transmitter, or generates the tone signal from a global positioning system (GPS) clock signal obtained by using the GPS. However, a frequency multiplication ratio between a symbol timing frequency and the output frequency is too high so that a very high output frequency jitter is caused by a timing jitter generated from the symbol timing synchronization process of the repeater. Accordingly, an unstable output frequency is obtained. Further, since different repeaters respectively have independent jitters, a receiver that simultaneously receives signals from two or more repeaters is deteriorated in receiving performance.

The GPS clock signal may be relatively more stable than the symbol or sample clock, but the GPS clock signal is not sufficiently accurate so that repeater manufacturing cost increases to improve the accuracy. Therefore, a method for reducing the timing jitter effect is needed.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a repeater having an advantage of reducing a frequency error in output signals of repeaters due to timing jitter, and a signal processing method and a frequency synchronization method of the repeater.

Technical Solution

An exemplary signal processing method according to an embodiment of the present invention is provided to a repeater that transmits a transmitting signal by processing a received signal.

The signal processing method includes: converting the received signal to a first intermediate frequency signal based on a local oscillating frequency for intermediate frequency conversion; converting the first intermediate frequency signal to a second intermediate frequency signal by performing digital processing on the first intermediate frequency signal; generating a first frequency tone signal that corresponds to a difference between a first radio frequency of the received signal and a second radio frequency of the transmitting signal; generating a second frequency tone signal from the local oscillating frequency for intermediate frequency conversion and the first frequency tone signal; and outputting the transmitting signal by up-converting the second intermediate frequency signal to the second radio frequency based on the second frequency tone signal.

An exemplary repeater according to another embodiment of the present invention processes a received signal and transmits a transmitting signal.

The repeater includes a down-converter, a digital signal processor, a frequency synchronizer, an up-converter, and a transmitter. The down-converter converts a first radio frequency of the received signal to a first intermediate frequency based on a local oscillating frequency. The digital signal processor down-converts the first intermediate frequency to a baseband frequency and frequency up-converts the baseband frequency to a second intermediate frequency. The frequency synchronizer generates a third radio frequency that corresponds to a difference between the first radio frequency and the second radio frequency according to a reference clock, and generates a fourth radio frequency by mixing the local oscillating frequency and the third radio frequency. The up-converter generates the second radio frequency by mixing the fourth radio frequency and the second intermediate frequency. The transmitter transmits the transmitting signal with the second radio frequency.

An exemplary frequency synchronization method according to another embodiment of the present invention is provided to a repeater that has different input and output frequencies.

The frequency synchronization method includes: generating a first frequency that corresponds to a difference between the input frequency and the output frequency; generating a second frequency by mixing a local oscillating frequency with the first frequency, wherein the local oscillating frequency for intermediate frequency conversion is used for down-converting the input frequency to the intermediate frequency; and generating the output frequency by mixing the first intermediate frequency and the second frequency.

Advantageous Effects

According to the exemplary embodiments of the present invention, a frequency error in transmitting signals between repeaters can be reduced by minimizing the influence of timing jitter.

BRIEF DESCRIPTION OF THE DRAWINGS

FIG. 1 schematically shows a digital broadcasting system according to the present invention.

FIG. 2 shows a concept of a frequency synchronization method according to an exemplary embodiment of the present invention.

FIG. 3 is a configuration block diagram of a repeater according to an exemplary embodiment of the present invention.

FIG. 4 is a flowchart of operation of the repeater according to the exemplary embodiment of the present invention.

FIG. 5 is a block diagram of a digital signal processor according to the exemplary embodiment of the present invention.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements. Also, the terms of a unit, a device, and a module in the present specification represent a unit for processing a predetermined function or operation, which can be realized by hardware, software, or a combination of hardware and software.

A repeater, a signal processing method, and a frequency synchronization method according to an exemplary embodiment of the present invention will be described with reference to the drawings.

FIG. 1 schematically shows a digital broadcasting system according to an exemplary embodiment of the present invention.

As shown in FIG. 1, the digital broadcasting system includes a main transmitter 100 and a plurality of repeaters 200.

The main transmitter 100 transmits a transmission signal through a transmission frequency (e.g., frequency A).

The plurality of repeaters 200 respectively receive the transmission signal transmitted from the main transmitter 100, and respectively transmit signals received through a frequency (e.g., frequency B) that is different from the frequency of the main transmitter 100.

In detail, the plurality of repeaters 200 convert the received signal into an intermediate frequency signal by performing down-conversion on the frequency of the received signal, and convert the intermediate frequency signal into a base band signal by performing digital signal processing. Then, the plurality of repeaters 200 frequency up-converts a baseband signal to an intermediate frequency signal by performing digital signal processing on the baseband signal, and then frequency up-converts the up-converted intermediate frequency signal so as to transmit a transmitting signal. The plurality of repeaters 200 according to the exemplary embodiment of the present invention generate a frequency that is different from a frequency generated by the main transmitter 100 as an output frequency from the up-converted intermediate frequency signal by using a method of FIG. 2.

FIG. 2 shows a concept of a frequency synchronization method of the repeater according to the exemplary embodiment of the present invention. In the following description, a signal received by the repeater 200 will be denoted as a received radio frequency signal, and a signal transmitted from the repeater 200 will be denoted as a transmitting radio frequency signal. In addition, an intermediate frequency signal that is frequency down-converted from the received radio frequency signal will be denoted as a received intermediate frequency signal, and an intermediate frequency signal that is frequency up-converted from the baseband signal will be denoted as a transmitting intermediate frequency signal.

As shown in FIG. 2, the repeater 200 according to the exemplary embodiment of the present invention mixes a transmitting intermediate frequency and local oscillating frequency that is used for frequency up-conversion, and generates a channel switching frequency that corresponds to a difference between a receiving radio frequency and a transmitting radio frequency according to a reference clock signal. In addition, the repeater 200 generates a transmitting radio frequency by mixing the transmitting intermediate frequency and the local oscillating frequency and then mixing the channel switching frequency and a result of the former synchronization. In this way, the frequency multiplication ratio of a symbol or a sample clock can be significantly reduced so that the influence of timing jitter in generation of a transmitting radio frequency can be minimized, thereby reducing a transmitting radio frequency error.

Although the repeater 200 is applied to the digital broadcasting system in FIG. 1, it can be applied to other communication systems.

The repeater 200 according to the exemplary embodiment of the present invention will be described in further detail with reference to FIG. 3 to FIG. 5.

FIG. 3 shows a configuration block diagram of the repeater according to the exemplary embodiment of the present invention, FIG. 4 shows an operation flowchart of the repeater according to the exemplary embodiment of the present invention, and FIG. 5 shows a configuration block diagram of the digital signal processor of FIG. 3.

As shown in FIG. 3, the repeater 200 according to the exemplary embodiment of the present invention includes a receiver 210, a local oscillator 220, a down-converter 230, a digital signal processor 240, a frequency synchronizer 250, an up-converter 260, and a transmitter 270.

Referring to FIG. 4, the receiver 210 receives a radio frequency signal transmitted from the main transmitter 100 through a receiving antenna (S410).

The local oscillator 220 generates a local oscillating frequency for intermediate frequency conversion in order to down-convert the received radio frequency signal to an intermediate frequency signal, and outputs the generated local oscillating signal to the down-converter 230 (S420).

The down-converter 230 frequency down-converts the received radio frequency signal to a received intermediate frequency signal based on the local oscillating frequency for intermediate frequency conversion (S430).

The digital signal processor 240 frequency down-converts the received intermediate frequency signal to a baseband signal, performs digital signal processing on the baseband signal, and then frequency up-converts the baseband signal to a transmitting intermediate frequency signal (S440). In this instance, the digital signal processor 240 performs digital signal processing so as to equalize the frequency of the received intermediate frequency signal and the frequency of the transmitting intermediated frequency signal.

The frequency synchronizer 250 generates a local oscillating frequency tone signal for frequency up-conversion on the basis of the received radio frequency signal, the transmitting radio frequency signal, and the local oscillating frequency for intermediate frequency conversion.

In further detail, the frequency synchronizer 250 according to the exemplary embodiment of the present invention includes a first frequency tone signal generator 252, a second frequency tone signal generator 254, and a band-pass filter 256. The first frequency tone signal generator 252 generates a channel switching frequency tone signal that corresponds to a difference between the receiving radio frequency and the transmitting radio frequency based on the reference clock signal (S450). Herein, the receiving radio frequency implies an output channel of the main transmitter 100, that is, an input channel frequency of the repeater 200, and the transmitting radio frequency implies an output channel frequency of the repeater 200.

The second frequency tone signal generator 254 generates a local oscillating frequency tone signal by mixing the local oscillating frequency for intermediate frequency conversion and the channel switching frequency tone signal (S460). The band-pass filter 256 band-filters the local oscillating frequency tone signal for frequency up-conversion according to whether the receiving radio frequency is higher or lower than the transmitting radio frequency (S470). When the receiving radio frequency is higher than the transmitting radio frequency, a high pass filter is used as the band-pass filter 256, and when the receiving radio frequency is lower than the transmitting radio frequency, a low pass filter is used as the band-pass filter 256.

The up-converter 260 frequency up-converts the transmitting intermediate frequency signal to a transmitting radio frequency signal based on the local oscillating frequency tone signal for frequency up-conversion (S480).

The receiver 270 transmits the transmitting radio frequency signal through a transmitting radio frequency (S490).

Although it is described that the transmitting radio frequency is generated by mixing the channel switching frequency with the mixed result of the transmitting intermediate frequency and the local oscillating frequency for frequency up-conversion for convenience in description of the concept of the frequency synchronization method of FIG. 2, the transmitting radio frequency can be generated by mixing the transmitting intermediate frequency signal with a result of the mixing of the channel switching frequency and the local oscillating frequency for frequency up-conversion for convenience in design and realization of the repeater 200, as shown in FIG. 4.

Referring to FIG. 5, the digital signal processor 240 includes an analog-to-digital converter 241, a frequency controller 242, a timing recovery unit 243, a channel equalizer 244, an interpolator 245, a frequency converter 246, a digital-to-analog converter 247, and a clock generator 248.

The analog-to-digital converter 241 converts the received intermediate frequency signal, which is an analog signal, into a digital signal according to sampling timing and outputs the digital signal.

The frequency controller 242 converts the received intermediate frequency signal into a baseband signal by estimating a frequency error from the output signal of the analog-to-digital converter 241 and compensating the estimated frequency error, and outputs the baseband signal.

The timing recovery unit 243 estimates a symbol timing error from the output signal of the frequency controller 242, and compensates the estimated symbol timing error. The sampling timing of the analog-to-digital converter 241 has a finite value due to complexity and power consumption of the digital signal processor 240. In this instance, symbol timing may not be equal to the sampling timing of the analog-to-digital converter 241. Therefore, the analog-to-digital converter 241 calculates a sample value that corresponds to random timing between sampling timing of the analog-digital converter 241 as symbol timing error information, or interpolates the sample value that corresponds to the random timing from the output signal of the frequency controller 242 by using an interpolation filter, and outputs an interpolation result. In this case, the timing recovery unit 243 transmits the symbol timing error information to the interpolator 245 or the clock generator 246.

After compensating channel distortion in the output signal of the timing recovery unit 243, the channel equalizer 244 determines a constellation point of the signal transmitted from the main transmitter 100 in a modulation constellation, and generates and outputs a modulation symbol that corresponds to the determined constellation point.

The interpolator 245 calculates a signal sample value that corresponds to the timing compensated with the symbol timing error information that is estimated from the output signal of the channel equalizer 244, and outputs the calculated signal sample value.

The frequency converter 246 reflects frequency error information to the output signal of the interpolator 245 and then outputs the frequency error information. That is, the frequency converter 246 performs complex multiplication between the complex tone signal and the output signal of the interpolator 245 by generating a complex tone signal that has the same frequency as in the frequency error information and frequency-converts the baseband signal to the intermediate frequency signal, and then outputs the intermediate frequency signal. Then, the frequency of the received intermediate frequency signal becomes identical to that of the transmitting intermediate frequency signal.

The digital-to-analog converter 247 converts the output digital signal of the frequency converter 246 to a transmitting intermediate frequency analog signal and outputs the transmitting intermediate frequency analog signal.

The clock generator 248 generates a symbol clock that is error-compensated according to the symbol timing error information. The symbol clock can be converted into a pulse density modulation (PDM) value and used as a reference clock for channel switching frequency generation. Accordingly, manufacturing cost of the repeater can be reduced since an external signal like a global positioning system (GPS) clock does not need to be used when the symbol clock is used as the reference clock.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A signal processing method of a repeater that processes a received signal and outputs a transmitting signal, the signal processing method comprising:
   converting the received signal to a first intermediate frequency signal based on a local oscillating frequency for intermediate frequency conversion;
   converting the first intermediate frequency signal to a second intermediate frequency signal by performing digital processing on the first intermediate frequency signal;
   generating a first frequency tone signal that corresponds to a difference between a first radio frequency of the received signal and a second radio frequency of the transmitting signal;
   generating a second frequency tone signal from the local oscillating frequency for intermediate frequency conversion and the first frequency tone signal; and
   outputting the transmitting signal by up-converting the second intermediate frequency signal to the second radio frequency based on the second frequency tone signal.

2. The signal processing method of claim 1, further comprising band-filtering the second frequency tone signal according to whether the first radio frequency is higher or lower than the second radio frequency.

3. The signal processing method of claim 2, wherein, when the first radio frequency is higher than the second radio frequency, a high frequency band signal of the second frequency tone signal is filtered.

4. The signal processing method of claim 2, wherein, when the first radio frequency is lower than the second radio frequency, a low frequency band signal of the second frequency tone signal is filtered.

5. The signal processing method of claim 2, wherein the outputting of the second intermediate frequency signal comprises:
   generating a second baseband signal by compensating a frequency error while frequency down-converting the first intermediate frequency signal to a first baseband signal;
   generating a third baseband signal by compensating a symbol timing error of the second baseband signal;
   generating a fourth baseband signal by reflecting the symbol timing error on the third baseband signal; and
   reflecting the frequency error on the fourth baseband signal and outputting the second intermediate frequency signal.

6. The signal processing method of claim 5, wherein the outputting of the second intermediate frequency signal further comprises generating a symbol clock from the third baseband signal, and the symbol clock serves as a reference clock for generating the first frequency tone signal.

7. The signal processing method of claim 1, wherein the first and second intermediate frequency signals have the same frequency.

8. A repeater for processing a received signal and transmitting a transmitting signal, the repeater comprising:
   a down-converter for converting a first radio frequency of the received signal to a first intermediate frequency based on a local oscillating frequency;
   a digital signal processor for down-converting the first intermediate frequency to a baseband frequency and frequency up-converting the baseband frequency to a second intermediate frequency;
   a frequency synchronizer for generating a third radio frequency that corresponds to a difference between the first radio frequency and the second radio frequency according to a reference clock, and generating a fourth radio frequency by mixing the local oscillating frequency and the third radio frequency;
   an up-converter for generating the second radio frequency by mixing the fourth radio frequency and the second intermediate frequency; and
   a transmitter for transmitting the transmitting signal with the second radio frequency.

9. The repeater of claim 8, wherein the frequency synchronizer comprises a band-pass filter for band-filtering according to whether the first radio frequency is higher or lower than the second radio frequency.

10. The repeater of claim 8, wherein the digital signal processor comprises:
    a frequency controller for compensating a frequency error of the received signal in frequency down-conversion to the baseband frequency;
    a symbol timing recovery unit for compensating a symbol timing error of the frequency error-compensated signal; and
    a clock generator for generating a symbol clock from the symbol timing error, wherein the symbol clock is used as the reference clock.

11. The repeater of claim 10, wherein the digital signal processor comprises:
    an interpolator for reflecting the symbol timing error again on the symbol timing error-compensated signal; and
    a frequency converter for outputting the second intermediate frequency signal by reflecting the frequency error again on a received signal on which the symbol time error is reflected,
    wherein the first intermediate frequency is the same as the second intermediate frequency.

12. A frequency synchronization method of a repeater of which input frequency and output frequency are different from each other, the frequency synchronization method comprising:
    generating a first frequency that corresponds to a difference between the input frequency and the output frequency;
    generating a second frequency by mixing a local oscillating frequency with the first frequency, wherein the local oscillating frequency for intermediate frequency conversion is used for down-converting the input frequency to the intermediate frequency; and
    generating the output frequency by mixing the first intermediate frequency and the second frequency.

13. The frequency synchronization method of claim 12, further comprising band-filtering the second frequency according to whether the input frequency is higher or lower than the output frequency.

* * * * *